United States Patent [19]

Birnie

[11] 4,060,698

[45] Nov. 29, 1977

[54] DIGITAL SWITCHING CENTER

[75] Inventor: Peter Alexander Birnie, Bromley, England

[73] Assignee: Post Office, London, England

[21] Appl. No.: 685,323

[22] Filed: May 11, 1976

[30] Foreign Application Priority Data

May 19, 1975 United Kingdom ............... 21180/75

[51] Int. Cl.² .............................................. H04J 3/00
[52] U.S. Cl. ............................ 179/15 AT; 179/15 BS
[58] Field of Search ............ 179/15 AP, 15 A, 15 BS, 179/15 AQ, 15 AT; 178/69.5 R

[56] References Cited

U.S. PATENT DOCUMENTS 3,959,588  5/1976  Kelly ................................. 179/15 BS Primary Examiner—Kathleen H. Claffy
Assistant Examiner—Joseph A. Popek
Attorney, Agent, or Firm—Hall & Houghton

[57] ABSTRACT

A switching center having a plurality of sets of buffer stores for connecting the channels of a plurality of pulse code modulated signal systems to the inputs of a multiplexer in which there is provided a unit for generating a false busy signal to prevent the reading of a buffer store at a time close to the time of writing into the store to reduce the possibility of simultaneous reading and writing and the consequent corruption of information.

7 Claims, 6 Drawing Figures

DIGITAL SWITCHING CENTER

This invention relates to time division multiplex (TDM) telecommunication systems with particular reference to a digital switching centre in which pulse code modulation (PCM) is employed for conveying information and wherein no demodulation-remodulation of the information is performed in the switching operation. The information to be transmitted may originate in the form of speech or data and may be converted to PCM form in any suitable manner. After transmission the data may be reconverted to its original form.

In a typical pulse code modulation signal system each of 32 different sets of data or channels is sampled at a sampling rate of 8 kHz, and each sample is converted to 8-bit digital form and transmitted serially, interleaved with the corresponding samples of the other 31 sets of data. As a result, in a time interval of 125 microseconds 32 8-bit words are transmitted serially in succession. Thus the time of a single 8-bit word, representing one sample of a PCM channel is 125/32 microseconds = 3.9 microseconds. This gives a bit rate in the signal system of 2.048 MHz.

In one proposed form of digital switching centre 16 PCM signal systems of the type described above are arranged to be received and transmitted by the switching centre, which effects the interconnection of one channel of an incoming PCM signal system to a selected channel of an outgoing PCM signal system. The switching centre operates on what is termed a time-space-time basis in which the signals from the 16 PCM signal systems are applied in sequence by a multiplexer to a space switch which connects these multiplexed signals to one or other of several demultiplexers for reforming into signals suitable for transmission over an outgoing PCM signal system.

The incoming PCM signal system has a time structure determined by the switching centre from which it originated, subject to any delays imposed by the transmission line over which it reaches the particular switching centre. Within the switching centre, however, the operations are timed by a local clock and it is therefore necessary to provide a line termination unit (LTU) for absorbing the differences between the time structure of the incoming PCM signal system and the operations of the digital switching centre as determined by the local clock. This operation is normally referred to as aligning the incoming PCM system and involves the provision of storage facilities for the incoming signals. It will be apparent that the time of writing into this store will depend upon which channel of the PCM signal system the signal is derived from, and the time of reading from the store will depend upon the signal transfer path required to be established within the switching centre because of the use of a multiplexer to perform some part of the path selection. Hitherto a search for an unoccupied signal transfer path follows a predetermined order through the paths and the first unoccupied path discovered is used. However, during the transmission of a predetermined block of data or, for example, a telephone call, variations between the time structure of the incoming PCM signal system and the local time structure within the switching centre can occur, which may result in the writing of one sample of a particular time slot into an aligner store at virtually the same time as the previous sample of the same time-slot is being read out from it by the multiplexer. When such near-coincident reading and writing occur corruption of the stored information can take place. This causes the previous sample of the time-slot under consideration to be discarded or repeated.

It is an object of the present invention to avoid the corruption which arises as described above.

According to the present invention there is provided a digital switching centre having a first set of signal stores connected to receive the signals of a set of pulse code modulation (PCM) signal systems respectively, each signal store having a plurality of registers for storing signals of a respective plurality of channels of the particular PCM signal system, and a switching means connected to derive signals from the signal stores of the first set in such a way as to establish signal transfer paths from registers of the signal stores, wherein means is provided for preventing the establishment of a particular signal transfer path from a register if that path would result in there being less that a predetermined interval of time between reception of signals by and the derivation of signals from the particular register.

In the establishment of a signal transfer path in a switching centre having as the switching means a multiplexer, space switch and a demultiplexer, it is usual to select the first transfer path discovered as a result of a search through the transfer paths which is available for use and not occupied or "busy." Thus the selection is effected in dependence upon a busy/free signal. In one example of the invention a false "busy" signal is generated if the writing and reading times of the particular register are too close together.

In order that the invention may be fully understood and readily carried into effect it will now be described with reference to the accompanying drawings, of which:

The switching centre to be described has as input and output 32 channel PCM signal systems of the type described above.

Figure 1:
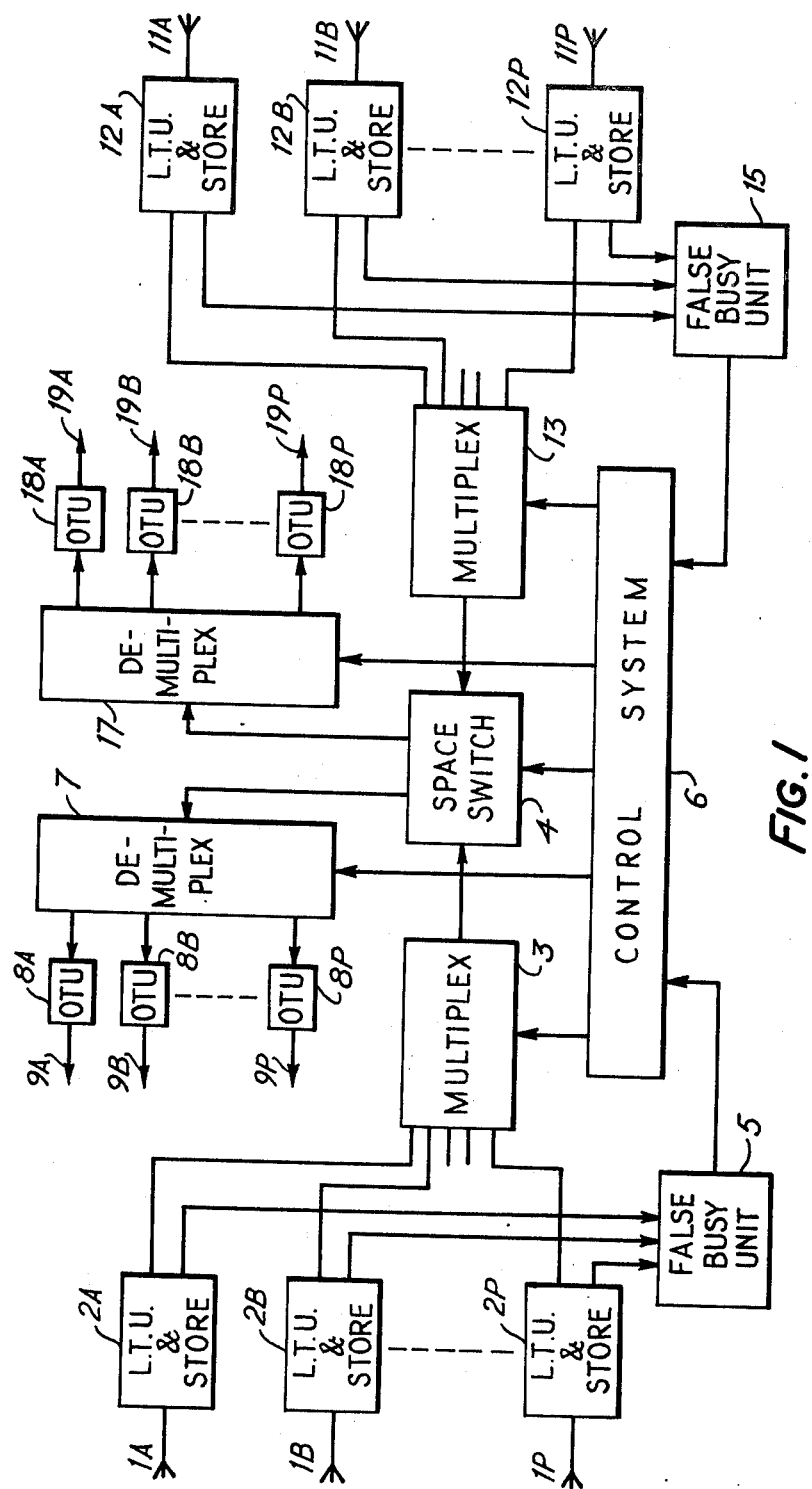
FIG. 1 is a schematic diagram of one example of a switching centre according to the invention.

The switching centre shown in FIG. 1 has a space switch 4 having a plurality of inputs respectively connectible to a plurality of outputs. Multiplexers 3 and 13 each having 16 inputs are connected to two of the inputs of the switch 4 and demultiplexers 7 and 17 each having 16 outputs are connected to two of the outputs of the switch 4. The space switch 4, the multiplexers 3 and 13 and the demultiplexers 7 and 17 are all controlled by a control system 6. Each multiplexer produces at its output a sequence of 8-bit words respectively derived from the inputs to the multiplexer in turn and at any time the space switch 4 connects the output of the multiplexer to the input of one of the demultiplexers synchronously with the operation of the multiplexer under the control of the system 6 so as to apply an 8-bit word from a particular input of the multiplexer to a selected demultiplexer where it is routed to a particular output to complete the required connection. This switching is performed for each 8-bit word at each input of each multiplexer and it will be evident that both the multiplexers and the demultiplexers operate acyclically.

Connected to the inputs of the multiplexer 3 are line terminating units (L.T.U.) and stores 2A to 2P. In each line terminating unit and store the signals of an incoming PCM signal system are converted from serial to parallel form 8 bits at a time and each 8-bit word is transferred into a buffer store. From the buffer store the 8-bit word is transferred into a system or speech store in parallel at one or other of two alternative instants in a cycle of operation of the system store. The cycle of operation of the system store includes 18 such instants, two of which are the writing instants just referred to which occur as the first and tenth instants in the cycle and the remaining 16 instants are available to enable the store to be read at 16 alternative times by the multiplexer for application of the information to the space switch.

Sixteen inputs 1A to 1P are connected to the sixteen line terminating units and stores 2A to 2P. The signal outputs of the units 2A to 2P are connected to the 16 : 1 multiplexer 3, the output from which is applied to a space switch 4. A second set of sixteen inputs 11A to 11P are connected through 16 line terminating units and stores 12A to 12P, and the other 16 : 1 multiplexer 13 to the space switch 4. Other outputs, the nature of which is to be described, are fed from the units 2A to 2P to a false busy unit 5. Similarly, other outputs from the units 12A to 12P are applied to a false busy unit 15. Outputs from the false busy units are applied to the control system 6 which is connected to operate the multiplexers 3 and 13 and the space switch 4 in known manner so as to set up signal transfer paths through the space switch 4.

Outputs from the space switch 4 are applied via the demultiplexers 7 and 17 to output transmission units 8A to 8P and 18A to 18P. Lines 9A to 9P are provided connected respectively to the output transmission units 8A to 8P for the transmission of PCM signal systems from the switching centre. Similarly the output transmission units 18A to 18P are connected to feed PCM signal systems to lines 19A to 19P. The control system 6 also controls the demultiplexers 7 and 17.

For convenience in FIG. 1 much of the logic for setting up a call through the switching centre is omitted because this would be of conventional construction. Suppose that a call is to be set up between channel 3 of the PCM signal system incoming to the switching centre along the line 1B and channel 5 of the PCM signal system outgoing from the switching centre along the line 19A. It will be assumed that this is a two-way communication and that incoming signals on channel 3 of the PCM signal system on line 1B originate from the same place as would receive channel 3 of the PCM signal system outgoing on line 9B. Similarly, channel 5 of the PCM signal system incoming on line 11A originates from the place which receives channel 5 of the PCM signal system outgoing on line 19A. Successive 8-bit words received along channel 3 of the PCM system on line 1B are stored in, for example, a register A (not shown) of the store in the unit 2B. Subsequent to their recording in the register A the 8-bit word is read by the multiplexer 3 at a time determined by the control system 6 and the word is transferred through the space switch 4, the multiplexer 17 into a register B, for example, (not shown) in the output transmission unit 18A, from which register B the signals to make up channel 5 of the outgoing PCM signal system on line 19A are formed. A similar signal transfer path is set up simultaneously between a register in the unit 12A and a register in the unit 8B. It will be apparent therefore that the register A in the unit 2B, for example, will be receiving signals at times dependent on the time structure of the incoming PCM signal system and will be read at times determined by the signal transfer path through the multiplexer 3, demultiplexer 17 and the space switch 4 under the control of the control system 6. It will also be apparent that a certain flexibility in the choice of reading time of the register A will probably be available provided that the switching centre is not overloaded with calls. The control system 6 is assumed to contain means for generating a busy/free signal for indicating which of the signal transfer paths through the multiplexers and demultiplexers are in use and which are available to be used. The false busy units 5 and 15 are arranged to operate as described below to indicate as "busy" certain of the signal transfer paths which are, in fact, not in use but which could result in corruption of the signals in the manner to be described.

Figures 2A, 2B, 2C, 2D:
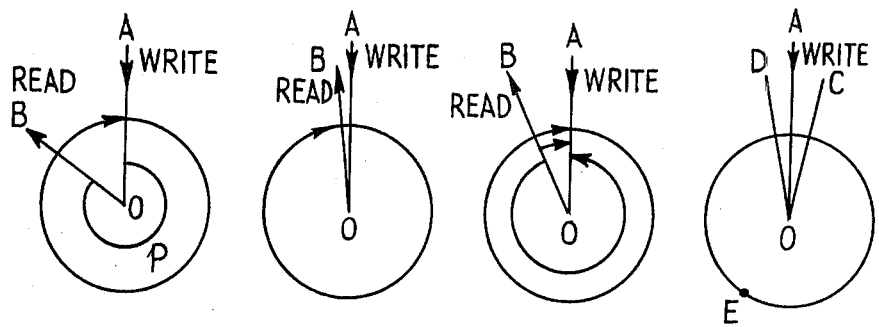
FIGS. 2A, 2B, 2C and 2D are diagrams to be used in explaining the operation of the invention.

The operation of a register in the store associated with the line termination unit will now be considered. This store contains 32 registers, each capable of storing an 8-bit word and each associated with a particular channel of the incoming PCM signal system. As a result of the 8 kHz sampling rate used in the PCM system the cycle time of updating of any one register in the store is 125 microseconds. In FIG. 2A the circle centred at O is described in a clockwise direction in 125 microseconds and the vector OA represents the instant of writing an 8-bit word in parallel into the particular register. At some time during the 125 microsecond cycle the register is read non-destructively by the multiplexer 3 and the instant of reading is represented by the vector OB. 125 microseconds after a word has been written into the register, it is overwritten with an updated word and subsequently this updated word is read until a further updated word is written into the register. The angle $p$ between the vectors OA and OB indicates the difference in time between the writing and reading operations. If the time structure of the incoming PCM signal system is such that the frame rate is slightly faster than that of the local time structure, then it will be apparent that the vector OB will rotate to the right relative to the vector OA, bringing them close together as shown in FIG. 2B. No corruption of the information stored in the register will take place unless the read vector OB becomes coincident with the write vector OA. The corruption arises because certain of the digits read from the register will be those existing before the write operation and others will be those existing after the write operation. Moreover, corruption can also occur because of the finite time necessary for a storage element in the register to react to information pulses applied to it. A similar situation would arise if the incoming frame rate were lower than the local frame rate, except that the vector OB would rotate anti-clockwise relative to the vector OA and cross it from right to left. To avoid corruption it is therefore necessary to prevent the vector OB crossing the vector OA. The rate of rotation of the vector OB relative to the vector OA would be quite small, possibly amounting to no more than 1/32 of a revolution (i.e. 1 channel period or 3.9 microseconds) in 20 minutes, so that the chance of corruption occurring in a call of, for example, 5 minutes can virtually be eliminated if it is arranged that the vector 0B is not permitted to be within 3.9 microseconds of the vector OA, either positively or negatively, at the start of the call. It has to be borne in mind that the vector OB can drift in both clockwise and anti-clockwise directions, and if the drifting is known to be likely to occur in a particular direction such as, for example, anti-clockwise, then with the situation shown in FIG. 2C it is clear that a much longer time will elapse before the vector OB crosses the vector OA if the drifting is anti-clockwise than if it is clockwise.

In accordance with one example of the invention therefore it is proposed to ensure that no signal transfer path can be set up which would involve the reading of a register within the duration of one time slot or 3.9 microseconds of information being written into it at the instant when the call is set up. Thus, as shown in FIG. 2D, a signal transfer path requiring the read vector to lie in the sector CED would be permitted to be set up, whereas it would not be permitted for the path to be set up if OB were required to lie in the sector CAD.

In one embodiment of the invention it is proposed to use the busy/free signalling system employed during searching for an available signal transfer path to prevent the setting up of such a path which will require the reading and writing instants of any register to be too close together.

Figure 3:
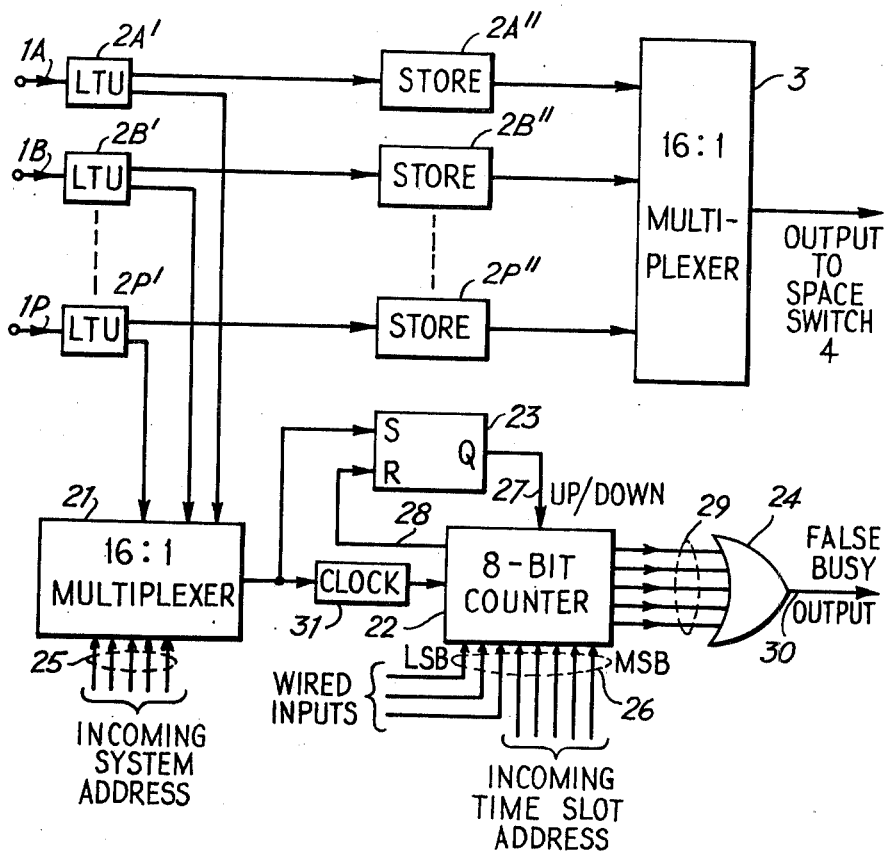
FIG. 3 is a block diagram showing in greater detail the contents of a false "busy" unit used in FIG. 1.

FIG. 3 shows in block form one example of a circuit arrangement for producing a false "busy" output for implementing this embodiment of the invention. Components of FIG. 3 which correspond to those of FIG. 1 carry the same references as in that Figure. For convenience in FIG. 3 the units 2A, 2B to 2P of FIG. 1 have been divided into the line termination units 2A' etc., and the stores 2A" etc. In each of the LTUs 2A' to 2P' a frame start pulse timed in accordance with the time structure of the incoming PCM signal system is produced and applied as an input to a 16 : 1 multiplexer 21. This frame start pulse does not occur at the start of the frame as such but is coincident with bit 8 of time slot O. The multiplexer 21 receives as another input a 4-bit word over lines 25 which is designated the incoming system address and indicates which of the sixteen PCM signal systems the multiplexer 21 is to select and derive a frame start pulse from for application to an 8-bit counter 22. The counter 22 is presettable so as to start from a given 8-bit number which is applied to it over lines 26 and can count upwards or downwards in response to a control signal applied to it via a conductor 27. Of the eight lines 26 the three allocated to the three bits of lowest significance are wired so as to insert "0" in these three digit places and the five bits of highest significance are connected to receive an incoming time slot address which identifies the time slot or channel of the particular incoming PCM signal system with which the circuit is concerned at the time. The output of the multiplexer 21 is also applied to the set input of an RS trigger 23, the Q output of which is connected to the conductor 27. The counter 22 produces an output on a conductor 28 when the total in the counter is zero, the conductor 28 being connected to the reset input of the trigger 23 so as to reset the trigger 23 to the "0" state when the counter 22 contains a total of 0, i.e. all digits are "0." Five output conductors 29 from the counter 22 are connected respectively to the five stages of greatest significance of the counter and are connected as inputs to a five input OR-gate 24, with the result that whenever the five bits of greatest significance in the counter 22 are all zero the gate 24 will produce a "0" output on its output conductor 30, which output is used to produce the false "busy" signal.

In the operation of the circuit of FIG. 3 the number loaded into the counter 22 along the lines 26 has as its five most significant digits the number of the time slot with which the circuit is concerned and zeros in the three least significant digit places. The clock 31 which is started by the frame start pulse selected by the multiplexer 21 produces clock pulses at 4.632 MHz with every ninth pulse missing. This clock pulse waveform corresponds to the sixteen read pulses described in the specification of copending application UK No. 1521/75. The missing ninth pulses provide the write opportunites for the store as described in the above specification. The operation of loading a number into the counter 22 is also arranged to set the trigger 23 so as to cause the counter 22 to count downwardly. As the frame start pulse is coincident with bit 8 of time slot O it will be apparent that the total in the counter 22 will be reduced until the five most signifant digits are zero when the first bit of the selected time slot occurs. During the 7th, 6th, . . . , last read pulse before the write pulse of that time slot the total in the counter is reduced from 00000110, 00000101, . . . to 00000000. When the all zero total occurs the signal is generated on the line 28 which resets the trigger 23 and causes the counter 22 to count upwardly. It will be apparent that during 14 of the output pulses from the clock 31 the total in the counter 22 will go from 00000111 down to 00000000 and then up again to 00000111. Throughout this period (16 digit times including the end pulses) the five most significant digits in the counter 22 are all zeros, and these being applied to the OR-gate 24 cause that gate to produce an "0" output for the whole of this time. The "0" output of the gate 24 is used to force a false "busy" condition on the selection circuits of the control system 6 of FIG. 1 and thereby prevents the establishment of a signal transfer path in which the reading and writing instants of the register of the store are closer together in time than 8-bits.

Since the timing of the outgoing PCM signal system is determined by the local clock the problems arising from the relative drifting between the time structure of the PCM signal system and the local time structure do not arise, and therefore there is no need for a false busy unit to be provided for the outgoing circuits. However, if the timing of the outgoing PCM signal systems were determined by a clock other than the local clock an additional false busy unit could be provided to avoid any difficulties resulting from the relative drifting of the two time structures.

In the line termination unit described in outline above, the timing of the writing operation in a store is variable, and in one example two alternative instants are provided for the timing operations respectively referred to as P1 and P2. Since the choice of P1 or P2 depends on factors which are not considered in the present application, it will be apparent that the actual timing instant must be regarded as being randomly variable between P1 and P2, so that the setting of the limiting instants for the reading operation, described above as being 8-bit times from the writing instant, cannot readily be achieved. There are two solutions to this problem. The first solution involves accepting that the drift tolerance in one direction is reduced from 8 bits to 4 but increased from 8 bits to 12 in the other. The second solution is to assume that a hypothetical write pulse occurs half way between P1 and P2 with the result that the drift tolerances are six bits or ten in one direction and ten bits or six in the other depending upon whether P1 or P2 is selected.

In the above description it has been assumed that a tolerance of 8 bits is sufficient to avoid corruption of the information during the period of a normal call, say 5 minutes. If this were found to be insufficient in particular circumstances, it would be possible to widen the prohibited region CAD of FIG. 2D with possibly a slight increase in difficulty in establishing signal transfer paths through the multiplexer, space switch and demultiplexer.

The invention can be used in conjunction with other types of line termination unit and switching centre than those described provided that a speech or system store is used as a buffer store in the input to a multiplexer.

I claim:

1. A digital switching centre having a first set of signal stores connected to receive the signals of a set of pulse code modulation (P.C.M.) signal systems respectively, each signal store having a plurality of registers for storing signals of a respective plurality of channels of the particular PCM signal system, a control means and a switching means responsive to the control means and connected to derive signals from the signal stores of the first set at selected times so as to establish selected signal transfer paths from registers of the signal stores, wherein there is provided means responsive to signals from the particular PCM signal system for producing an indication of the time of occurrence of a selected channel of the system, the control means being responsive to the indication to prevent the establishment of a particular signal transfer path from the register for storing signals from the selected channel if that path would result in there being less than a predetermined interval of time between the reception of signals by and the derivation of signals from the register for storing signals from the selected channel.

2. A centre according to claim 1 wherein the control means includes means for searching among suitable signal transfer paths to select a path for effecting a desired signal connection and means for producing a busy signal if a particular signal transfer path is not available, the searching means being responsive to a busy signal so as not to select a signal transfer path which is not available, the means for producing an indication producing a false busy signal to prevent the searching means from selecting a signal transfer path which would result in there being less than the predetermined interval of time between the reception of signals by and the derivation of signals from the register for storing signals from the selected channel.

3. A centre according to claim 2 wherein the switching means includes a plurality of multiplexers, a space switch connected to receive the outputs of the multiplexers and a plurality of demultiplexers having inputs connected to the space switch, the inputs of the multiplexers being connected to receive via signal stores the signals of respective P.C.M. signal systems, the outputs of the demultiplexers being arranged to provide the signals for respective outgoing P.C.M. signal systems, and the control means being arranged to establish a repeating cycle of different signal paths from inputs of multiplexers through the space switch to outputs of demultiplexers, each signal path carrying the signals of a particular channel of a P.C.M. signal system.

4. A centre according to claim 3 wherein a plurality of means for producing a false busy signal are provided respectively associated with the plurality of multiplexers.

5. A centre according to claim 2 wherein the means for producing an indication includes multi-stage counting means for clock pulses and means responsive to the outputs of a plurality of the stages of the counting means to produce the false busy signal.

6. A centre according to claim 5 including means for setting an initial state dependent on the time slot of the selected channel into the counting means and means for controlling the application of clock pulses to the counting means in dependence upon a reference time of the P.C.M. system to which the selected channel belongs, whereby the counting means stores a predetermined total when the register for the selected channel is receiving signals.

7. A centre according to claim 6 wherein the predetermined total is zero and means is provided for reversing the sense of counting of the counting means when the total in the counting means reaches zero.

* * * * *